United States Patent
Suh et al.

(10) Patent No.: US 11,673,311 B2
(45) Date of Patent: Jun. 13, 2023

(54) APPARATUS FOR MANUFACTURING POUCH

(71) Applicant: LG Chem, Ltd., Seoul (KR)

(72) Inventors: Jin Ook Suh, Daejeon (KR); Sung Joon Park, Daejeon (KR); Yo Jin Kim, Daejeon (KR)

(73) Assignee: LG Energy Solution, Ltd.

( * ) Notice: Subject to any disclaimer, the term of this patent is extended or adjusted under 35 U.S.C. 154(b) by 466 days.

(21) Appl. No.: 16/753,468

(22) PCT Filed: Feb. 27, 2019

(86) PCT No.: PCT/KR2019/002389
§ 371 (c)(1),
(2) Date: Apr. 3, 2020

(87) PCT Pub. No.: WO2019/172575
PCT Pub. Date: Sep. 12, 2019

(65) Prior Publication Data
US 2020/0331187 A1   Oct. 22, 2020

(30) Foreign Application Priority Data
Mar. 6, 2018   (KR) .................. 10-2018-0026263

(51) Int. Cl.
*B29C 51/08* (2006.01)
*B29C 51/26* (2006.01)
(Continued)

(52) U.S. Cl.
CPC .......... *B29C 51/087* (2013.01); *B29C 51/266* (2013.01); *B29C 51/30* (2013.01);
(Continued)

(58) Field of Classification Search
CPC ..... B29C 51/087; B29C 51/266; B29C 51/30; B29C 51/421; B29C 51/082; B29C 51/04;
(Continued)

(56) References Cited

U.S. PATENT DOCUMENTS 6,315,150 B1 * 11/2001 Takai .................... B29C 51/428
220/675
2010/0209764 A1   8/2010 Heo et al.
(Continued)

FOREIGN PATENT DOCUMENTS

CN   102044714 A   5/2011
CN   202263846 U   6/2012
(Continued)

OTHER PUBLICATIONS

Extended European Search Report with Written Opinion for Application No. 19764564.1 dated Sep. 8, 2020, 8 pages.
(Continued)

*Primary Examiner* — Francisco W Tschen
*Assistant Examiner* — Elisa H Vera
(74) *Attorney, Agent, or Firm* — Lerner David LLP

(57) ABSTRACT

An apparatus for manufacturing a pouch includes a die in which a pair of forming grooves are formed with a partition wall therebetween in a top surface thereof; and a pair of punches disposed above the die configured to form a pair of accommodation parts in a pouch film while being respectively inserted into the pair of forming grooves in a state of pressing the pouch film, wherein a pressing surface of each of the punches, which is configured to press the pouch film, has an inclined angle that is inclined upward from one end thereof disposed at a side of the partition wall toward an opposite end thereof.

8 Claims, 8 Drawing Sheets

(51) Int. Cl.
  *B29C 51/30* (2006.01)
  *B29C 51/42* (2006.01)
  *H01M 10/04* (2006.01)
  *H01M 50/103* (2021.01)
  *H01M 50/105* (2021.01)
  *B29L 31/00* (2006.01)

(52) U.S. Cl.
  CPC ....... *B29C 51/421* (2013.01); *H01M 10/0436* (2013.01); *H01M 50/103* (2021.01); *H01M 50/105* (2021.01); *B29L 2031/7146* (2013.01)

(58) Field of Classification Search
  CPC .... B29C 53/40; B29C 51/08; H01M 10/0436; H01M 50/103; H01M 50/10; H01M 10/04; H01M 50/116; H01M 10/049; B29L 2031/7146; Y02E 60/10; Y02P 70/50
  See application file for complete search history.

(56) References Cited

U.S. PATENT DOCUMENTS

| | | | |
|---|---|---|---|
| 2013/0101894 A1 | 4/2013 | Baba et al. | |
| 2013/0252081 A1* | 9/2013 | Kim | H01M 50/10 429/186 |
| 2015/0024263 A1 | 1/2015 | Han | |
| 2016/0214307 A1* | 7/2016 | Motosko | E04C 2/20 |
| 2017/0229682 A1 | 8/2017 | Fauteux et al. | |
| 2018/0219245 A1 | 8/2018 | Choi et al. | |
| 2018/0366690 A1* | 12/2018 | Levin | B29C 43/14 |

FOREIGN PATENT DOCUMENTS

| | | |
|---|---|---|
| CN | 103872267 A | 6/2014 |
| CN | 104669596 A | 6/2015 |
| CN | 206432294 U | 8/2017 |
| CN | 206834211 U | 1/2018 |
| EP | 2985805 A1 | 2/2016 |
| JP | 2004071301 A | 3/2004 |
| JP | 2013206678 A | 10/2013 |
| JP | 2013225406 A | 10/2013 |
| JP | 2015024657 A | 2/2015 |
| KR | 20060011428 A | 2/2006 |
| KR | 20100025669 A | 3/2010 |
| KR | 20100094174 A | 8/2010 |
| KR | 20120014267 A | 2/2012 |
| KR | 101243560 B1 | 3/2013 |
| KR | 20150010481 A | 1/2015 |
| KR | 101513810 B1 | 4/2015 |
| KR | 20150081799 A | 7/2015 |
| KR | 20160096417 A | 8/2016 |
| KR | 20170052061 A | 5/2017 |

OTHER PUBLICATIONS

International Search Report for Application No. PCT/KR2019/002389 dated Jun. 4, 2019, 4 pages.

Search Report dated Nov. 25, 2021 from the Office Action for Chinese Application No. 2019800035088 dated Dec. 3, 2021, 3 pgs.

* cited by examiner

APPARATUS FOR MANUFACTURING POUCH

CROSS-REFERENCE TO RELATED APPLICATIONS

The present application is a national phase entry under 35 U.S.C. § 371 of International Application No. PCT/KR2019/002389, filed Feb. 27, 2019, which claims the benefit of the priority of Korean Patent Application No. 10-2018-0026263, filed on Mar. 6, 2018, both of the disclosure of which are hereby incorporated by reference in their entirety.

TECHNICAL FIELD

The present invention relates to an apparatus and method for manufacturing a pouch and a method for manufacturing a secondary battery, and more particularly, to an apparatus and method for manufacturing a pouch, which are capable of improving quality of the pouch that is folded in the form of a pocket, and a method for manufacturing a secondary battery.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

The pouch comprises an upper case and a lower case. The upper case and the lower case comprise upper and lower accommodation parts that respectively accommodate upper and lower portions of the electrode assembly in central portions thereof, connection parts connecting side surfaces of the upper and lower accommodation parts to each other, and sealing parts formed on remaining surfaces of the upper and lower accommodation parts except for the connection part.

A method for manufacturing the pouch having the above-described configuration comprises a forming step of forming upper and lower accommodation parts in both sides of the separation sheet with respect to a center of the separation sheet and a bending step of bending a connection part provided between the upper and lower accommodation parts so that the upper and lower accommodation parts correspond to each other.

Here, in the forming step, each of the upper and lower accommodation parts is formed so that one end disposed at one side of the connection part and the other end disposed at the other side of the connection part have the same height.

However, in each of the upper and lower accommodation parts, elastic restoring force is largely applied to the one end disposed at the one side of the connection part rather than the other end disposed at the other side of the connection part to cause a height deviation, and thus, there is a problem in which defective products occur.

That is, since the one end of each of the upper and lower accommodation parts is tensioned to bisect an area of the connection part, the elastic restoring force is relatively largely applied to the one end rather than the other end. Thus, there is a problem in which the elastic restoring force is relatively largely applied to the one end of each of the upper and lower accommodation parts rather than the other end to cause the height deviation.

DISCLOSURE OF THE INVENTION

Technical Problem

The present invention has been made to solve the above problem, an object of the present invention is to provide an apparatus and method for manufacturing a pouch, in which upper and lower accommodation parts are formed in a pouch film, wherein the a connection part connecting the upper and lower accommodation parts to each other is formed so that one end of the connection part is higher than that of the other end that is a side opposite to the one end, and thus, when the upper and lower accommodation parts are restored, the heights of the one end and the other end of each of the upper and lower accommodation parts are reduced to equally match each other, thereby improving quality of the pouch, and a method for manufacturing a secondary battery.

Technical Solution

In order to accomplish the above object, a pouch manufacturing apparatus according to a first embodiment of the present invention comprises: a die in which a pair of forming grooves are formed with a partition wall therebetween in a top surface thereof; and a pair of punches disposed above the die configured to form a pair of accommodation parts in a pouch film while being respectively inserted into the pair of forming grooves in a state of pressing the pouch film, wherein a pressing surface of each of the punches, which is configured to press the pouch film, has an inclined angle that is inclined upward from one end thereof disposed at a side of the partition wall toward an opposite end thereof.

The inclined angle of each of the pressing surfaces may be 2° to 10°.

A bottom surface of each of the forming grooves may have an inclined angle that is the same as the inclined angle of the respective pressing surface of the punch.

The apparatus may further comprise a punch holder including the pair of punches, wherein the punch holder may allow the pair of punches to move at the same time.

The apparatus may further comprise an adjusting part coupling one of the punches to the punch holder, wherein an angle of the pressing surface of the respective punch is adjustable.

The adjusting part may comprise a hinge pin rotatably hinge-coupling the one end of the punch to the punch holder and an adjusting bolt passing through the punch holder so as to be freely rotatably coupled to the opposite end of the punch and allowing the opposite end to descend or ascend toward the die according to a rotating direction to adjust the angle of the pressing surface.

A heating member generating heat may be disposed in the partition wall.

A method for manufacturing a pouch according to the first embodiment of the present invention comprises: a step (a) of disposing a pouch film on a top surface of a die in which a pair of forming grooves are formed with a partition wall therebetween; a step (b) of inserting a pair of punches, each of which has a pressing surface that is inclined upward from one end disposed at a side of the partition wall toward an opposite end, into the pair of forming grooves together with the pouch film to form a pair of accommodation parts in the pouch film; and a step (c) of folding a folding part formed between the pair of accommodation parts so that the pair of accommodation parts face each other, wherein, in each of the accommodation parts formed through the step (b), one end of the accommodation part, which is disposed at the side of the partition wall, is formed at a depth that is greater than a depth of another end that is an opposite side of the one end.

The step (a) may comprise a step of heating the pouch film disposed on the partition wall.

The step (b) may comprise a step of leaving the pouch film for a predetermined time until elastic restoring of the accommodation part is completed after the pair of accommodation parts are formed.

A method for manufacturing a secondary battery according to a second embodiment of the present invention comprises: a step (A) of performing the method for manufacturing a pouch according to the first embodiment of the present invention; a step (B) of accommodating an electrode assembly in the pouch; and a step (C) of sealing a sealing part formed on a remaining side surface of the pouch except for a folding part of the pouch.

Advantageous Effects

First: the apparatus for manufacturing the pouch according to the present invention may comprise the die on which the pouch film is disposed and in which the pair of forming grooves are formed with the partition wall therebetween and the punches inserted into the forming grooves to form accommodation parts in the pouch film, wherein the pressing surface of the punch, which performs the forming process on the pouch film, has the inclined angle that is gradually inclined upward from the one end disposed at the partition wall-side to the other end. Due to this feature, the forming process may be performed so that the one end of the accommodation part disposed at the partition wall-side has the height greater than that of the other end. Thus, when the accommodation part is restored by the elastic restoring force, the heights of the one end and the other end of the accommodation part may be adjusted to equally match each other. That is, since the forming process is performed so that the one end of the accommodation part has the height greater than that of the other end, the heights of the one end and the other end of the accommodation part may be adjusted to equally match each other.

Second: in the apparatus for manufacturing the pouch according to the present invention, the pressing surface of the punch may have the inclined angle of 2° to 10°. That is, when the pressing surface of the punch has the inclined angle of 2° or less, since the inclined angle is not large, the height deviation between the one end and the other end of the accommodation part may not be large. Thus, it is impossible to equally match the heights of the one end and the other end of the accommodation part. Also, when the pressing surface of the punch has the inclined angle of 10° or more, the heights of the one end and the other end of the accommodation part may be adjusted to equally match each other. However, the one end of the accommodation part may be excessively formed to cause the cracks. Thus, the pressing surface of the punch may have the inclined angle of 2° to 10° so that the heights of the one end and the other end of the accommodation part are stably adjusted to equally match each other.

Third: in the apparatus for manufacturing the pouch according to the present invention, the bottom surface of the forming groove formed in the die may have the same inclined angle as the pressing surface of the punch. Due to this feature, the pouch film disposed between the punch and the forming groove may be pressed to more accurately form the accommodation part in the pouch film, thereby improving the quality of the pouch.

Fourth: in the apparatus for manufacturing the pouch according to the present invention, the pair of punches may be provided on the punch holder. Due to this feature, the pair of punches may descend or ascend at the same time. Thus, the accommodation parts having the same shape may be formed in the pouch film to improve the quality of the pouch.

Fifth: the apparatus for manufacturing the pouch according to the present invention may further comprise the adjusting part for coupling the punch of which the angle of the pressing surface is adjustable to the punch holder. Due to this feature, the inclined angle of the pressing surface provided on the punch may be freely adjusted within the range of 2° to 10°, and thus, the heights of the one end and the other end of the accommodation part may be stably adjusted to equally match each other.

Sixth: in the apparatus for manufacturing the pouch according to the present invention, the adjusting part may comprise the hinge pin and the adjusting bolt. Due to this feature, the inclined angle of the pressing surface provided on the punch coupled to the punch holder may be more accurately and simply adjusted to improve the efficiency of the work.

Seventh: in the apparatus for manufacturing the pouch according to the present invention, the heating member generating heat may be built in the partition wall provided on the die. Due to this feature, the pouch film disposed on the partition wall may be heated to increase in elongation. Therefore, when the forming process is performed on the pouch film, the forming process may be stably performed on the pouch film disposed on the partition wall-side.

MODE FOR CARRYING OUT THE INVENTION

Figure 1:
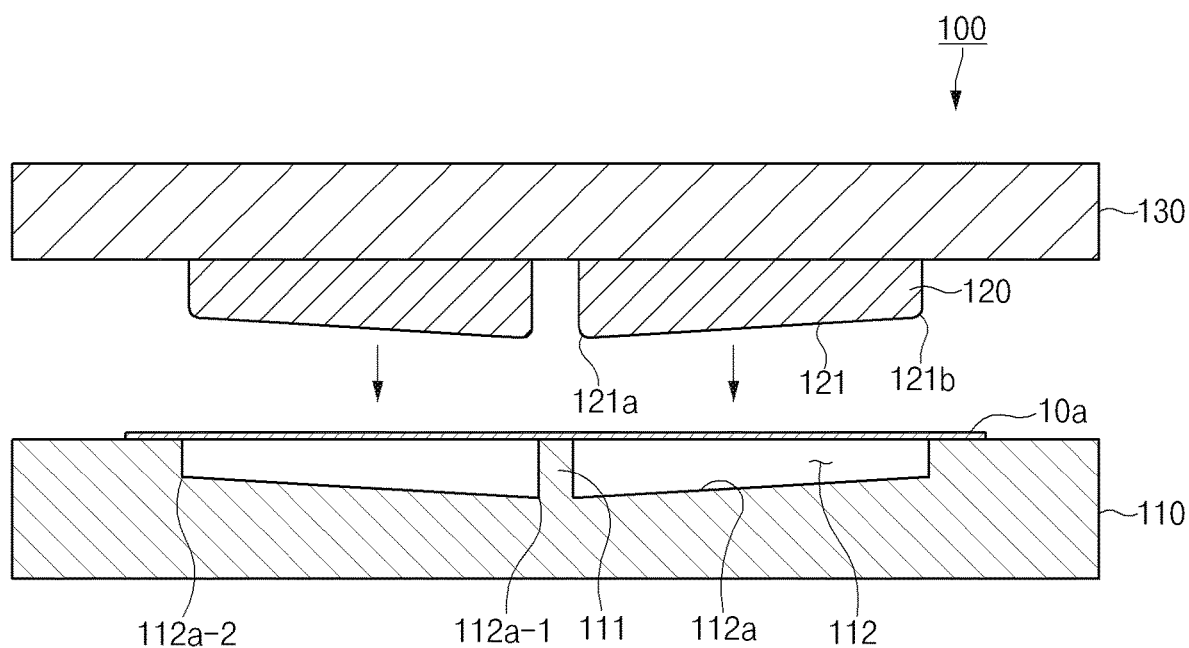
FIG. 1 is a cross-sectional view of an apparatus for manufacturing a pouch according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Apparatus for Manufacturing Pouch According to First Embodiment of the Present Invention]

Figure 2:
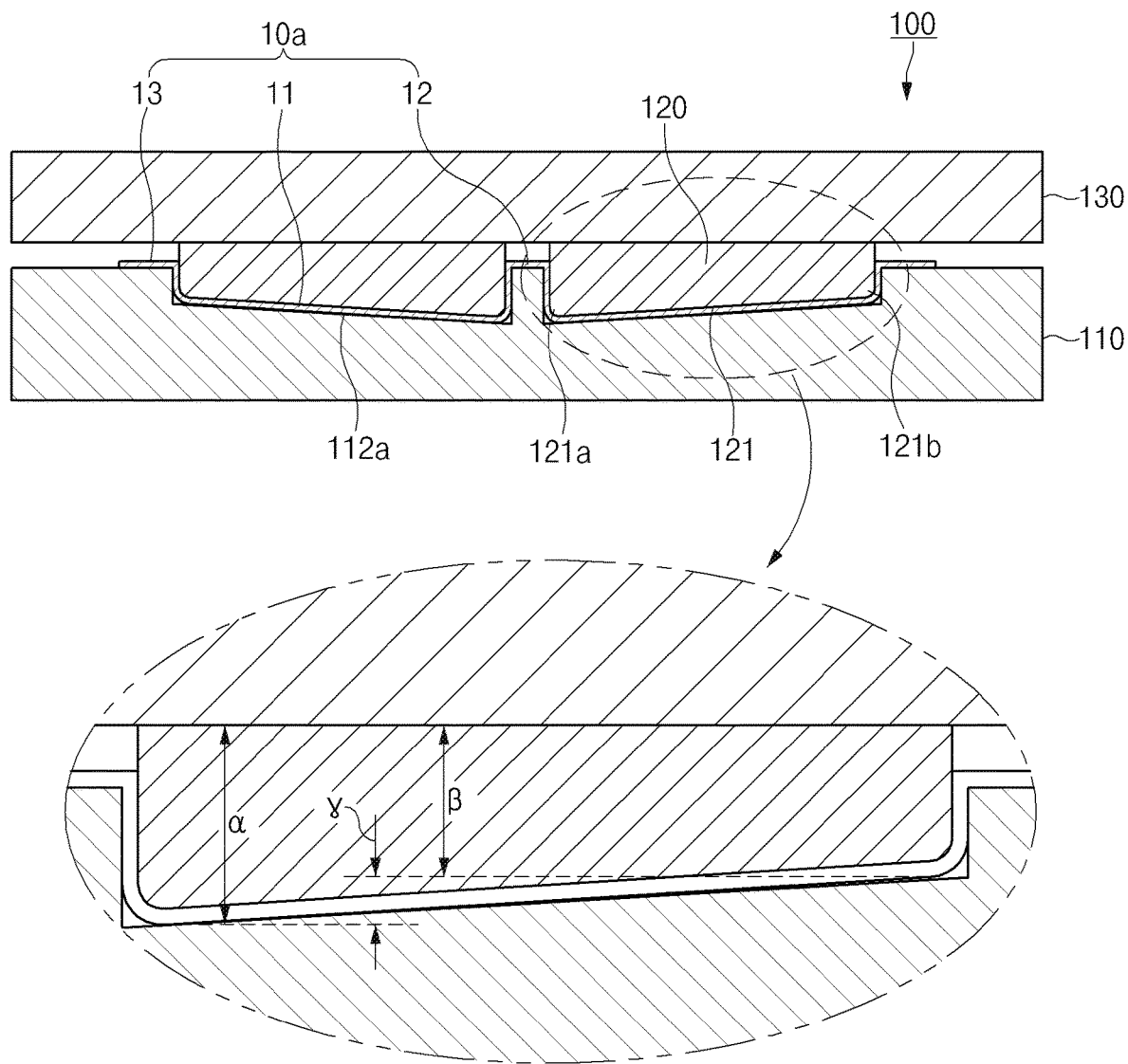
FIG. 2 is a cross-sectional view illustrating a use state of the apparatus for manufacturing the pouch according to the first embodiment of the present invention.

As illustrated in FIGS. 1 and 2, an apparatus 100 for manufacturing a pouch according to a first embodiment of the present invention comprises a die 110 in which a pair of forming grooves 112 are formed with a partition wall 111 therebetween in a top surface thereof, on which a pouch film 10a is disposed, and a pair of punches 120 disposed above the die 110 to form a pair of accommodation parts 11 in the pouch film 10a while being respectively inserted into the pair of forming grooves 112 in a state of pressing the pouch film 10a.

That is, in the apparatus 100 for manufacturing the pouch according to the first embodiment of the present invention, the pouch film 10a is disposed on a top surface of the die 110, and then, the pair of punches 120 descend. As a result, the pair of punches 120 are inserted into the forming grooves 112 in the state of pressing the pouch film 10a to form the accommodation parts 11 in the pouch film 10a.

Figure 3:
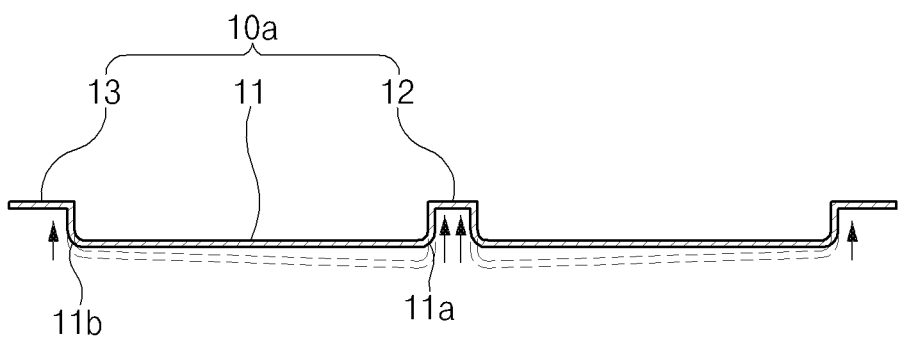
FIG. 3 is a cross-sectional view illustrating a restored state of a pouch film manufactured by the apparatus for manufacturing the pouch according to the first embodiment of the present invention.

As illustrated in FIG. 3, in each of the accommodation parts 11 formed in the pouch film 10a, relatively large restoring force may be applied to one end 11a of the accommodation part 11 disposed on the partition wall 111 when compared to the other end 11b that is an opposite side of the one end 11a. Thus, when the one end 11a and the other end 11b of the accommodation part 11 are formed at the same height, a difference in height between the one end 11a and the other end 11b of the accommodation part 11 may occur by the different restoring force.

To prevent this phenomenon from occurring, the apparatus 100 for manufacturing the pouch according to the present invention may have a structure for equally adjusting the heights of the one end 11a and the other end 11b of the accommodation part 11, which have different restoring force.

For example, referring to FIG. 1, a pressing surface 121 of the punch 120, which presses the pouch film 10a, has an inclined angle that is gradually inclined upward from one end 121a disposed at a side of the partition wall 111 toward the other end 121b. Thus, the one end 11a of the accommodation part 11 may be formed to have a length greater than that of the other end 11b. As a result, as illustrated by a dotted line in FIG. 3, the one end 11a and the other end 11b of the accommodation part 11 may be restored to equally match the heights of the one end 11a and the other end 11b of the accommodation part 11.

In more detail, referring to the enlarged view of FIG. 2, when the forming process is performed on the pouch film 10a disposed on the die 110 by using the inclined pressing surface 121 to manufacture the accommodation part 11, the one end 11a of the accommodation part 11, which is disposed at the side of the partition wall 111 may be formed at a length (or height) 'α', and the other end 11b may be formed at a length (or height) 'β'. Thus, the one end 11a of the accommodation part 11 may be further formed by the length (or height) 'γ' when compared to the other end 11b.

Also, as illustrated in FIG. 3, when the pouch film 10a manufactured by the apparatus 100 for manufacturing the pouch is left for a predetermined time, the restoring force may occur. Here, the one end 11a of the accommodation part 11 may be more largely restored than the other end 11b, and thus, a difference in height between the one end 11a and the other end 11b of the accommodation part 11 may occur.

In summary, the apparatus 100 for manufacturing the pouch according to the first embodiment of the present invention may more lengthily form the one end 11a of the accommodation 11 than the other end 11b that is an opposite side of the one end 11a. Thus, the heights of the one end 11a and the other end 11b of the accommodation part 11 may equally match each other to improve quality of the pouch.

The pressing surface 121 of the punch 120 has an inclined angle of 2° to 10°. That is, when the pressing surface 121 of the punch 120 has an inclined angle of 2° or less, since the inclined angle is not large, the forming process may be performed so that the one end 11a of the accommodation part 11 has a height greater than that of the other end 11b that is the opposite side of the one end 11a. Thus, the heights of the one end 11a and the other end 11b of the accommodation part 11 may equally match each other. Also, when the pressing surface 121 of the punch 120 has an inclined angle of 10° or more, the one end 11a of the accommodation part 11 may be largely formed to cause cracks. Thus, the pressing surface 121 of the punch 120 may have the inclined angle of 2° to 10° to stably equally match the heights of the one end 11a and the other end 11b of the accommodation part 11.

In the apparatus 100 for manufacturing the pouch according to the first embodiment of the present invention, a bottom surface 112a of the forming groove 112, which corresponds to the pressing surface 121 of the punch 120, may have the same inclined angle as the pressing surface 121 as illustrated in FIG. 1.

For example, referring to FIG. 1, the bottom surface 112a may have an inclined angle that is gradually inclined upward from one end 112a-1 connected to a side of the partition wall 111 toward the other end 112a-2 that is an opposite side of the one end 112a-1. Thus, when the punch 120 is inserted into the forming groove 112 of the die 110, the pressing surface 121 and the bottom surface 112a may be closely attached to each other to stably adsorb the pouch film 10a, thereby accurately forming the accommodation part 11.

Here, the bottom surface 112a of the forming groove 112 may have a horizontal shape. That is, the bottom surface 112a of the forming groove 112 may have the same horizontal surface as the pouch film 10a disposed on the die 110.

In the apparatus 100 for manufacturing the pouch according to the first embodiment of the present invention, the pair of punches 120 are provided on a punch holder 130. That is, referring to FIG. 1, the pair of punches 120 may be disposed on a bottom surface of the punch holder 130. Thus, when the punch holder 130 descends or ascends, the pair of punches 120 may descend or ascend at the same time, and thus, the pair of accommodation parts 11 may be formed at the same time in the pouch film 10a.

Figure 5:
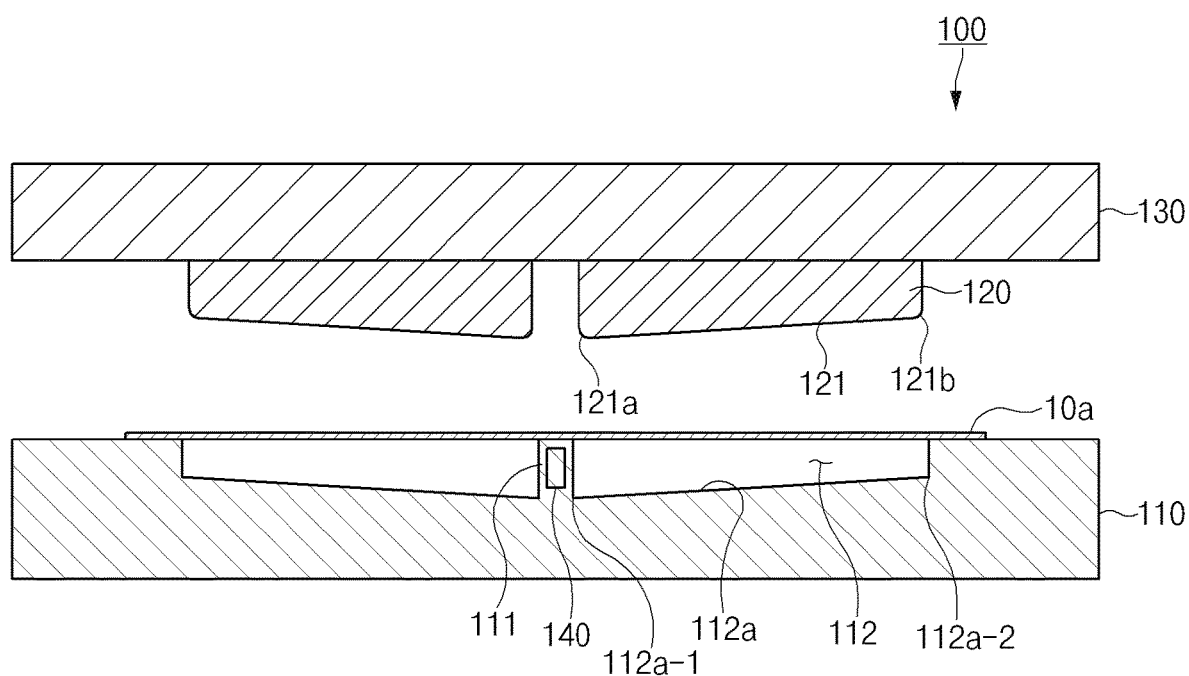
FIG. 5 is a cross-sectional view illustrating a heating member of the apparatus for manufacturing the pouch according to the first embodiment of the present invention.

As illustrated in FIG. 5, in the apparatus 100 for manufacturing the pouch according to the first embodiment of the present invention, a heating member 140 generating heat is built in the partition wall 111. The heating member 140 may be disposed on or closely attached to the partition wall 111 to heat the pouch film 10a. That is, when the forming process is performed on the pouch film 10a disposed on the side of the partition wall 111 by using the punch 120, cracks may occur. To prevent the cracks from occurring, the heating member 140 may be built in the partition wall 111, and the pouch film 10a that is disposed on or closely attached to the side of the partition wall 111 may be heated through the heating member 140 to increase in elongation. Thus, when the forming process is performed on the pouch film 10a disposed on the side of the partition wall 111, the occurrence of the cracks may be prevented.

A heating wire generating heat when power is supplied may be used as the heating member 140. Also, the heating member 140 may further comprise a switch. The switch may turn on or off the heating wire. Also, the heating member 140 may further comprise a control part. The control part controls a temperature of the heating wire.

Thus, as illustrated in FIG. 3, in the apparatus 100 for manufacturing the pouch according to the first embodiment of the present invention, the pair of accommodation parts 11 may be stably formed in the pouch film 10a. Particularly, the heights of the one end 11a and the other end 11b of the accommodation part formed in the pouch film 10a may equally match each other.

Furthermore, in the pouch film 10a in which the heights of the one end 11a and the other end 11b of the accommodation part 11 equally match each other, when a folding part 12 disposed between the pair of accommodation parts 11 is folded so that the pair of accommodation parts 11 correspond to or face each other, the pouch 10 that is a finished product may be obtained.

That is, the pair of accommodation parts 11 may be formed at a center of the pouch that is the finished product. Also, the folding part 12 may be formed on one side surface (a left surface when viewed in FIG. 4), and a sealing part 13 may be formed on a remaining side surface except for the folding part 12.

Hereinafter, a method for manufacturing the pouch by using the apparatus for manufacturing the pouch, which has the above-described configuration, according to the first embodiment of the present invention will be described.

[Method for Manufacturing Pouch According to First Embodiment of the Present Invention]

Figure 6:
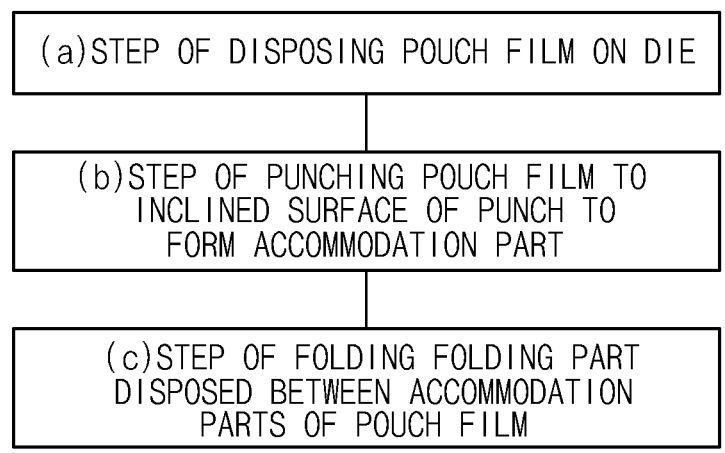
FIG. 6 is a flowchart illustrating a method for manufacturing a pouch according to the first embodiment of the present invention.

As illustrated in FIG. 6, a method for manufacturing the pouch according to the first embodiment of the present invention comprises a step (a) of disposing a pouch film, a step (b) of forming a pair of accommodation pars in the pouch film, and a step (c) of folding a folding part formed between the pair of accommodation parts.

Referring to FIG. 1, in the step (a), the pouch film 10a is disposed on a die 110 in which a pair of forming grooves 112 are formed with a partition wall 11 therebetween.

Here, referring to FIG. 5, the step (a) may further comprise a step of heating the pouch film 10a disposed on the partition wall 111 to increase in elongation. That is, a heating member 140 is built in the partition wall 111. The heating member 140 may generate heat when power is supplied thereto to heat the pouch film 10a that is disposed on or closely attached to the partition wall 111 so that a temperature increases. Thus, the pouch film 10a disposed on the partition wall 111 may increase in elongation.

Referring to FIG. 2, in the step (b), a punch holder 130 disposed above the die 110 descends. Thus, the pair of punches 120 disposed on a bottom surface of the punch holder 130 may descend together and then be respectively inserted into the pair of forming grooves 112 in a state of pressing the pouch film 10a. Therefore, the accommodation part 11 may be formed in the pouch film 10a.

Here, as illustrated in FIG. 1, a pressing surface 121 of the punch 120 that presses the pouch film 10a is formed at an inclined angle that is gradually inclined upward from one end 121a disposed at a side of the partition wall 111 toward the other end 121b. Thus, the accommodation part 11 is formed so that one end 11a of the accommodation part disposed at the side of the partition wall 111 has a height greater than that of the other end 11b that is an opposite side of the one end 11a.

Here, as illustrated in FIG. 3, the step (b) further comprises a step of leaving the pouch film 10a, in which the accommodation part 11 is formed, for a predetermined time. Thus, a portion of the formed accommodation part 11 is restored. Here, the one end 11a of the accommodation part 11 is more largely restored than the other end 11b to equally match the heights of the one end 11a and the other end 11b of the accommodation part 11.

The predetermined time may be 1 minute to 10 minutes. That is, when the predetermined time is less than 1 minute, the pouch film may not be completely restored. When the predetermined time is greater than 10 minute, even though the pouch film is completely restored, a work time may be excessively spent to deteriorate workability. Thus, the predetermined time may be set to the range of 1 minute to 10 minutes to improve efficiency of the work.

The step (b) may further comprise a defect inspection step of inspecting whether defects occur by measuring and comparing the heights of the one end 11a and the other end 11b of the accommodation part 11.

That is, referring to the enlarged view of FIG. 2, in the defect inspection step, the accommodation part 11 formed in the pouch film 10a is photographed to measure each of lengths of the one end 11a and the other end 11b of the accommodation part 11 through the photographed image of the accommodation part 11. Here, when a difference value y between a measured length a of the one end 11a and a measured length p of the other end 11b is within a set range, it is determined as normal, and when the difference value y is out of the set range, it is determined as defective.

The set range may be 0.1 mm to 5.0 mm, particularly, 0.5 mm to 2.0 mm. That is, when the set range is less than 0.1 mm, accuracy has to increase, and thus, the work efficiency may be deteriorated. When the set range is greater than 5.0 mm, a difference in height between the one end 11a and the other end 11b of the accommodation part 11 may be large to cause defective products. Thus, the set range may be set to 0.1 mm to 5.0 mm, particularly, 0.5 mm to 2.0 mm to improve quality of the pouch film.

Figure 4:
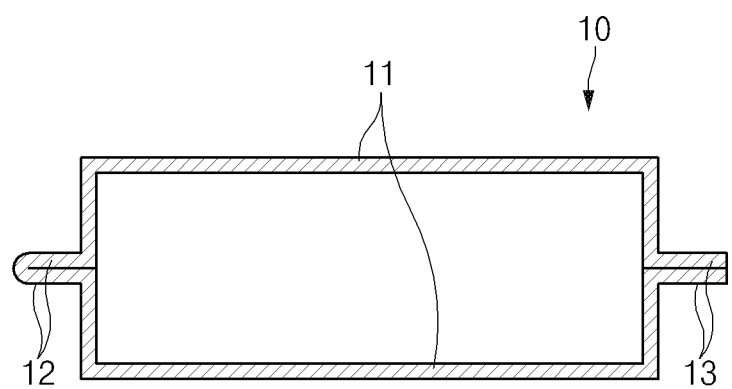
FIG. 4 is a cross-sectional view of the pouch according to the first embodiment of the present invention.

Referring to FIG. 4, in the step (c), the folding part 12 formed between the pair of accommodation parts 11 are folded so that the pair of accommodation parts 11 correspond to or face each other. Therefore, the finished product pouch 10 may be obtained.

Hereinafter, in descriptions of another embodiment of the present invention, constituents having the same configuration and function as the abovementioned embodiment have been given the same reference numeral in the drawings, and thus duplicated description will be omitted.

[Method for Manufacturing Secondary Battery According to Second Embodiment of the Present Invention]

Figure 7:
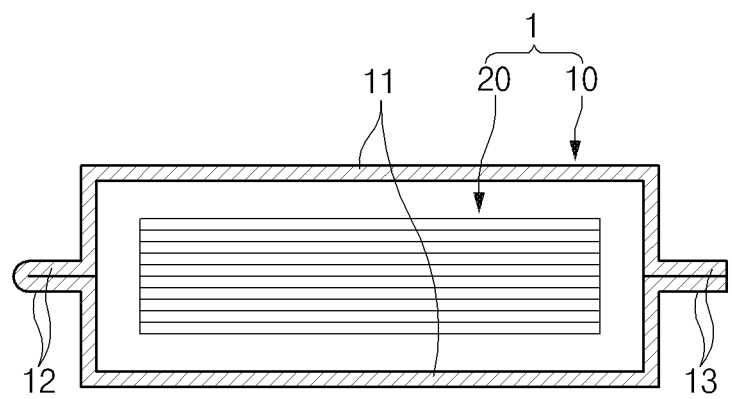
FIG. 7 is a cross-sectional view of a secondary battery according to a second embodiment of the present invention.

As illustrated in FIG. 7, a method for manufacturing a secondary battery according to a second embodiment of the present invention may comprise a step (A) of manufacturing a pouch 10 having a pocket shape, a step (B) of accommodating an electrode assembly 20 in the pouch 10, and a step (C) of sealing a sealing part formed on a remaining side surface of the pouch 10 except for the folding part 12 of the pouch 10. A secondary battery 1 that is a finished product may be manufactured through the above-described steps.

Here, the step (A) comprises a step (a) of disposing a pouch film on a top surface of a die in which a pair of forming grooves are formed with a partition wall therebetween, a step (b) of inserting a pair of punches, each of which has an inclined surface that is gradually inclined upward from one end disposed at a side of the partition wall toward the other end, into the pair of forming grooves together with the pouch film to form a pair of accommodation parts in the pouch film, and a step (c) of folding a folding part formed between the pair of accommodation parts so that the pair of accommodation parts correspond to each other. In the accommodation parts formed through the step (b), one end of the accommodation part, which is disposed at the side of the partition wall, is formed at a depth that is greater than that of the other end that is an opposite side of the one end.

The step (A) is the same as the above-described method for manufacturing the pouch, and thus, its detailed description will be omitted.

Thus, in the method for manufacturing the secondary battery according to the second embodiment of the present invention, the pouch in which the one end and the other end, which is the opposite to the one end, of the accommodation part have the same height may be provided to manufacture the secondary battery 1, thereby significantly improving quality of the secondary battery 1.

[Apparatus for Manufacturing Pouch According to Third Embodiment of the Present Invention]

An apparatus for manufacturing a pouch according to a third embodiment of the present invention is provided as another example of the apparatus according to the foregoing first embodiment of the present invention.

Figure 8:
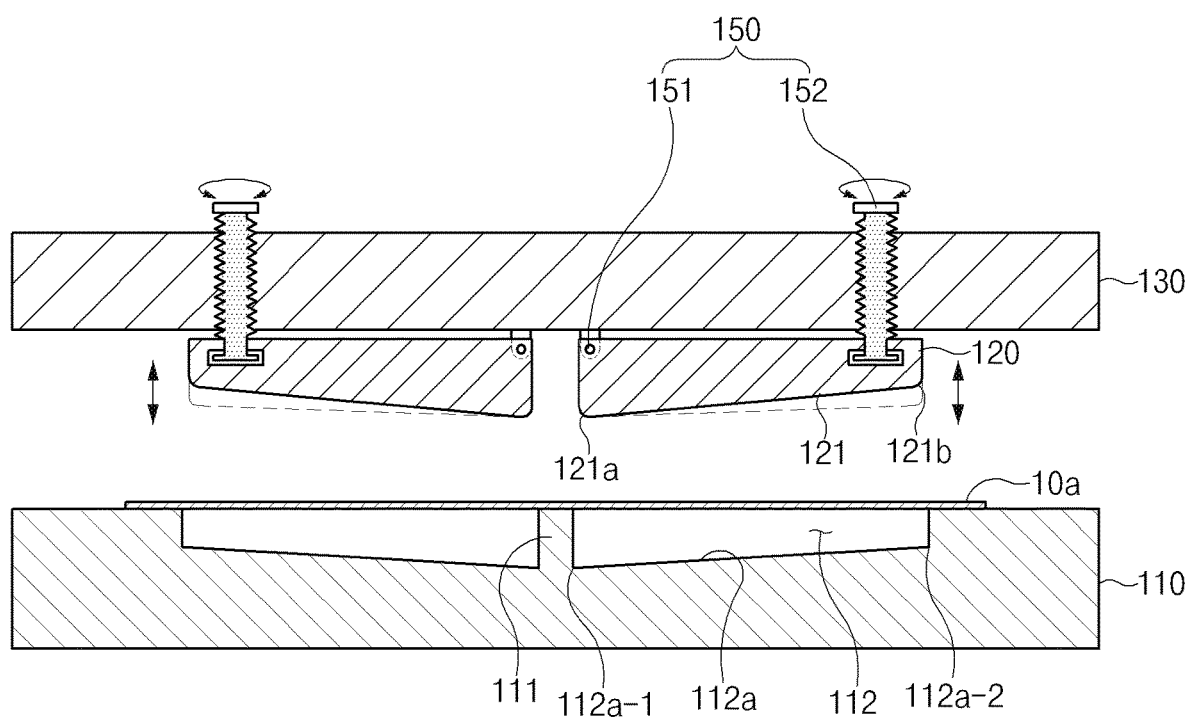
FIG. 8 is a cross-sectional view of an apparatus for manufacturing a pouch according to a third embodiment of the present invention.

That is, as illustrated in FIG. 8, an apparatus 100 according to a third embodiment of the present invention comprises an adjusting part 150 coupling a punch 120 to a punch holder 130 so that an angle of a pressing surface provided on the punch 120 is adjustable. Thus, the angle of the pressing surface 121 provided on the punch 120 may be adjustable according to a thickness and a material of a pouch film 10a, and thus, heights of one end 11a and the other end 11b of an accommodation part 11 formed in the pouch film 10a may equally match each other.

For example, as illustrated in FIG. 8, the adjusting part 150 comprises a hinge pin 151 rotatably hinge-coupling one end 121a of the punch 120 to the punch holder 130 and an adjusting bolt 152 passing through the punch holder 130 so as to be freely rotatably coupled to the other end 121b of the punch 120 and allowing the other end 121b to descend or ascend toward the pouch film 10a according to the rotating direction to adjust the angle of the pressing surface 121.

That is, the adjusting part 150 may allow the other end 121b of the punch 120 to ascend or descend according to the rotating direction of the adjusting bolt 152 to adjust the angle of the pressing surface 121 with respect to the pouch film 10a.

The adjusting part 150 may adjust the pressing surface 121 so that the pressing surface 121 provided on each of the pair of punches 120 disposed on the punch holder 130 has an inclined angle with respect to the pouch film 10a or adjust the pressing surface 121 so that the pressing surface 121 has the same horizontal surface as the pouch film 10a.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing a pouch, the apparatus comprising:
a die in which a pair of forming grooves are formed with a partition wall therebetween in a top surface thereof; and
a pair of punches disposed above the die configured to form a pair of accommodation parts in a pouch film while being respectively inserted into the pair of forming grooves in a state of pressing the pouch film,
wherein a pressing surface of each of the punches, which is configured to press the pouch film, has an inclined angle that is inclined upward from one end thereof disposed at a side of the partition wall toward an opposite end thereof, so that the one end of each of the punches disposed at the side of the partition wall is longer than the opposite end.

2. The apparatus of claim 1, wherein the inclined angle of each of the pressing surfaces is 2° to 10°.

3. The apparatus of claim 1, wherein a bottom surface of each of the forming grooves has an inclined angle that is the same as the inclined angle of the respective pressing surface of the punch.

4. The apparatus of claim 1, further comprising a punch holder including the pair of punches,
wherein the punch holder allows the pair of punches to move at the same time.

5. The apparatus of claim 4, further comprising an adjusting part coupling one of the punches to the punch holder,
wherein an angle of the pressing surface of the respective punch is adjustable.

6. The apparatus of claim 5, wherein the adjusting part comprises a hinge pin rotatably hinge-coupling the one end of the punch to the punch holder and an adjusting bolt passing through the punch holder so as to be freely rotatably coupled to the opposite end of the punch and allowing the opposite end to descend or ascend toward the die according to a rotating direction to adjust the angle of the pressing surface.

7. The apparatus of claim 1, wherein a heating member generating heat is disposed in the partition wall.

8. The apparatus of claim 7, wherein the heating member is a heating wire.

* * * * *